US012456021B2

United States Patent
Dong et al.

(10) Patent No.: US 12,456,021 B2
(45) Date of Patent: Oct. 28, 2025

(54) METHOD AND APPARATUS FOR TRANSLATING AN APPLICATION PROGRAM

(71) Applicant: BEIJING BYTEDANCE NETWORK TECHNOLOGY CO., LTD., Beijing (CN)

(72) Inventors: Ming Dong, Beijing (CN); Li Liu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 155 days.

(21) Appl. No.: 17/724,837

(22) Filed: Apr. 20, 2022

(65) Prior Publication Data

US 2023/0102082 A1    Mar. 30, 2023

(30) Foreign Application Priority Data

Sep. 26, 2021    (CN) .......................... 202111130160.4

(51) Int. Cl.
*G06F 40/47*    (2020.01)
*G06F 40/103*    (2020.01)
*G06F 40/279*    (2020.01)

(52) U.S. Cl.
CPC ............ *G06F 40/47* (2020.01); *G06F 40/103* (2020.01); *G06F 40/279* (2020.01)

(58) Field of Classification Search
CPC ....... G06F 40/47; G06F 40/279; G06F 40/103
See application file for complete search history.

(56) References Cited

U.S. PATENT DOCUMENTS

| 5,664,206 A * | 9/1997 | Murow ................... G06F 40/58 |
| | | 704/8 |
| 9,535,904 B2 | 1/2017 | Prokofyev et al. |
| 2002/0107684 A1* | 8/2002 | Gao ........................ G06F 40/30 |
| | | 704/4 |
| 2003/0135501 A1* | 7/2003 | Frerebeau ............... G06F 9/454 |

(Continued)

FOREIGN PATENT DOCUMENTS

| CN | 106844355 A | 6/2017 |
| CN | 111652007 A | 9/2020 |

(Continued)

OTHER PUBLICATIONS

Maurer, Ward Douglas, and Ted G. Lewis. "Hash table methods." ACM Computing Surveys (CSUR) 7.1 (1975): 5-19. (Year: 1975).*

(Continued)

*Primary Examiner* — Brian L Albertalli

(57) ABSTRACT

The present disclosure provide a method and apparatus for translating an application, which relate to the field of information processing technology. The present disclosure enables: detecting time information in the application to be translated; acquiring attribute information of the time information, the attribute information including at least one of target translation languages of the time information, time units contained in the time information, and a number of bits of the data of individual time units of the time information; determining a display format according to the attribute information; and translating the time information based on the display format.

7 Claims, 3 Drawing Sheets

(56) References Cited

U.S. PATENT DOCUMENTS

| | | | | |
|---|---|---|---|---|
| 2005/0192794 | A1* | 9/2005 | Ertemalp | G06F 9/454 |
| | | | | 704/8 |
| 2005/0216256 | A1 | 9/2005 | Lueck | |
| 2008/0215309 | A1 | 9/2008 | Weischedel et al. | |
| 2010/0211377 | A1* | 8/2010 | Aoyama | G06F 40/51 |
| | | | | 704/8 |
| 2013/0179145 | A1* | 7/2013 | Patel | G06F 40/58 |
| | | | | 704/2 |
| 2013/0226554 | A1* | 8/2013 | Dillard | G06F 40/186 |
| | | | | 704/2 |
| 2015/0154182 | A1* | 6/2015 | Chandrasekharan | G06F 9/454 |
| | | | | 715/239 |
| 2015/0278201 | A1* | 10/2015 | Prokofyev | G06Q 10/10 |
| | | | | 704/2 |
| 2015/0286609 | A1 | 10/2015 | Hahn et al. | |
| 2019/0228058 | A1* | 7/2019 | Shang | G06F 16/986 |
| 2020/0117638 | A1* | 4/2020 | Wang | G06F 11/1448 |

FOREIGN PATENT DOCUMENTS

| | | |
|---|---|---|
| CN | 112232020 A | 1/2021 |
| JP | 2006-268136 A | 10/2006 |
| JP | 2015-197922 A | 11/2015 |

OTHER PUBLICATIONS

Unicode CLDR Project, "Date/Time Patterns", downloaded from https://cldr.unicode.org/translation/date-time/date-time-patterns, May 14, 2018. (Year: 2018).*

Edberg, "Unicode Technical Standard #35: Unicode Locale Data Markup Language (LDML): Part 4: Dates", Version 38, Oct. 23, 2020. (Year: 2020).*

Aniszczyk, "TwitterCLDR: Improving Internationalization Support in Ruby", downloaded from https://blog.x.com/engineering/en_us/a/2012/twittercldr-improving-internationalization-support-in-ruby, Aug. 1, 2012. (Year: 2012).*

Communication Pursuant to Rules 70(2) and 70a(2) EPC for European Application No. 22871919.1, mailed Nov. 26, 2024, 1 page.

Extended European Search Report for European Application No. 22871919.1, mailed Nov. 7, 2024, 11 pages.

Office action received from Japanese patent application No. 2024-518909 mailed on Feb. 18, 2025, 7 pages (4 pages English Translation and 3 pages Original Copy).

Halike et al., "Research on Recognition and Translation of Chinese-Uyghur Time and Numeral and Quantifier," Journal of Chinese Information Processing, vol. 30, No. 6, Nov. 2016 (with English abstract).

* cited by examiner

METHOD AND APPARATUS FOR TRANSLATING AN APPLICATION PROGRAM

CROSS REFERENCE TO RELATED APPLICATIONS

This application is based on and claims priority of CN application with application No. 202111130160.4 filed on Sep. 26, 2021, the entire disclosure of which is hereby incorporated by reference.

TECHNICAL FIELD

The present disclosure relates to the field of information processing technology, and in particular, to a method and apparatus for translating an application program.

BACKGROUND

With the increasing development of internationalization, it becomes more and more common for a same Application (APP) to serve users with various languages. In order to make the application better serve the users, the content in the application often needs to be translated into multiple languages.
Time information is a kind of information that is ubiquitous in applications. When an application needs to be translated into an application with a target translation language, time information in the application also needs to be displayed using display rules for the target translation language. In the prior art, when translating an application, time information in an application is translated as text, and display format of the translated time information is set by a developer based on his/her own understanding of display rules for the time information of a target translation language. However, indifferent language environments, display rules, such as time units that time information needs to include, the order between individual time units, and whether to use plural form, will be different, and manually determining the display format of the translated time information is likely to cause the display format of the translated time information incorrect due to confusing, wrongly memorizing display rules for the time information in different language environments.

SUMMARY

In view of this, embodiments of the present disclosure provide a method and apparatus for translating an application.
In a first aspect, some embodiments of the present disclosure provide a method for translating an application, comprising: detecting time information in the application to be translated; acquiring attribute information of the time information, the attribute information including at least one of target translation languages of the time information, time units contained in the time information, and a number of bits of the data of individual time units of the time information; acquiring a display format according to the attribute information; and translating the time information based on the display format.
In some other embodiments, the determining the display format according to the attribute information comprises: acquiring a format identifier according to the attribute information; and determining the display format according to the format identifier and a configuration file, the configuration file including a correspondence between the format identifier and the display format.
In some other embodiments, the acquiring the format identifier according to the attribute information comprises: acquiring a target calculation value based on a preset algorithm to calculate the attribute information; and acquiring the format identifier according to the target calculation value.
In some other embodiments, the preset algorithm is a message digest algorithm MD5 or a hash algorithm.
In some other embodiments, the detecting time information in the application to be translated comprises: performing regular matching on character strings in the application to be translated, and determining a character string in the application to be translated that matches a target regular expression as the time information in the application to be translated.
In some other embodiments, before performing regular matching on character strings in the application to be translated, the method further comprises: acquiring the target regular expression according to the current language of the application to be translated.
In some other embodiments, the translating the time information based on the display format comprises: setting at least one of the time units contained in the translated time information, the sort order of individual time units of the translated time information, the number of bits of individual time units of the translated time information, and whether individual time units of the translated time information use plural form, based on the display format.
In a second aspect, some embodiments of the present disclosure provide an apparatus for translating an application, comprising: a detection unit for detecting time information in the application to be translated; an acquisition unit for acquiring attribute information of the time information, the attribute information including at least one of target translation languages of the time information, time units contained in the time information, and a number of bits of the data of individual time units of the time information; a processing unit for determining a display format according to the attribute information; and a translation unit for translating the time information based on the display format.
In some other embodiments, the processing unit is specifically used to acquire a format identifier according to the attribute information; and determine the display format according to the format identifier and a configuration file; wherein, the configuration file includes a correspondence between the format identifier and the display format.
In some other embodiments, the processing unit is specifically used to acquire a target calculation value based on a preset algorithm to calculate the attribute information, and acquire the format identifier according to the target calculation value.
In some other embodiments, the preset algorithm is a message digest algorithm MD5 or a hash algorithm.
In some other embodiments, the detection unit is specifically used to perform regular matching on character strings in the application to be translated, and determine a character string in the application to be translated that matches a target regular expression as the time information in the application to be translated.
In some other embodiments, the detection unit is further used to acquire the target regular expression according to the current language of the application to be translated before performing regular matching on character strings in the application to be translated.

In some other embodiments, the translation unit is specifically used to set at least one of the time units contained in the translated time information, the sort order of individual time units of the translated time information, the number of bits of individual time units of the translated time information, and whether individual time units of the translated time information use plural form, based on the display format.

In a third aspect, some embodiments of the present disclosure provide an electronic device, comprising: a memory and a processor, the memory being used to store a computer program; when invoking the computer program, the processor being used to cause the electronic device to implement the method for translating an application described in any of the foregoing embodiments.

In a fourth aspect, some embodiments of the present disclosure provide a non-transitory computer-readable storage medium having a computer program stored thereon, which, when executed by a computing device, causes the computing device to implement the method for translating an application described in any of the foregoing embodiments.

In a fifth aspect, some embodiments of the present disclosure provide a computer program product, which, when runs on a computer, causes the computer to implement the method for translating an application described in any of the foregoing embodiments.

When translating an application, the method for translating an application provided by the embodiments of the present disclosure first detects time information in the application to be translated, acquires attribute information of the time information, and then determines a display format of the time information according to the attribute information, and translates the time information based on the display format.

BRIEF DESCRIPTION OF THE DRAWINGS

The accompanying drawings, which are incorporated in and constitute a part of this specification, illustrate embodiments consistent with the disclosure and use to explain principles of the disclosure together with the specification.

In order to more clearly illustrate technical solutions in embodiments of the present disclosure or the prior art, the following briefly introduces the accompanying drawings that need to be used in the description of the embodiments or the prior art. Apparently, for those of ordinary skill in the art, other drawings can also be obtained from these drawings under the premise of no creative work.

DETAILED DESCRIPTION

In order to more clearly understand above objectives, features and advantages of the present disclosure, the solutions of the present disclosure will be further described below. It should be noted that the embodiments of the present disclosure and features in the embodiments may be combined with each other under the condition of no conflict.

Many specific details are set forth in the following description to facilitate a full understanding of the present disclosure, but the present disclosure can also be implemented in other ways different from those described herein; obviously, the embodiments in the specification are only a part, not all, of the embodiments of the present disclosure.

In the embodiments of the present disclosure, words such as "exemplary" or "for example" are used to represent serving as an example, illustration, or explanation. Any embodiments or design solutions described in the embodiments of the present disclosure as "exemplary" or "for example" should not be construed as preferred or advantageous over other embodiments or design solutions. More precisely, the use of words such as "exemplary" or "for example" is intended to present the related concepts in a specific manner. In addition, in the description of the embodiments of the present disclosure, the meaning of "a plurality of" refers to two or more, unless otherwise specified.

The term "at least one of" in the description and claims of embodiments of the present disclosure is meant to encompass any one or more of the listed items. For example: "at least one of A, B, and C" could be: 1, including only A; 2, including only B; 3, including only C; 4, including A and B; 5, including A and C, 6; including B and C; 7, including: including A, B and C.

The execution body of a method for translating an application provided by the embodiment of the present disclosure can be an application translation device. The application translation device can be a notebook, a personal computer (PC), an ultra-mobile personal computer (UMPC), a netbook, a personal digital assistant (PDA), or the application translation device can also be other type of devices, which are not limited in the embodiments of the present disclosure.

Figure 1:
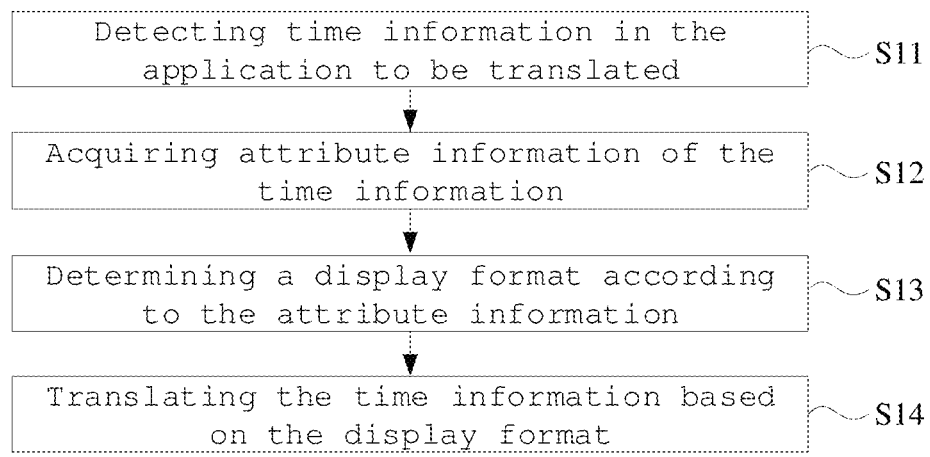
FIG. 1 is one of the flow charts of the steps of a method for translating an application provided by some embodiments of the present disclosure.

Based on above, some embodiment of the present disclosure provides a method for translating an application. Referring to FIG. 1, the method for translating an application comprises following steps:

S11. Detecting time information in the application to be translated.

Specifically, the time information in the embodiment of the present disclosure may include: time and/or date. For example, the time information may include 11:41:01; for another example, the time information may include: Sep. 9, 2021, and for another example: the time information may include: Sep. 9, 2021 11:41:57.

S12. Acquiring attribute information of the time information.

Wherein, the attribute information includes at least one of target translation languages of the time information, time units contained in the time information, and a number of bits of the data of individual time units of the time information.

In some embodiment of the present disclosure, when an application needs to be translated into a certain language, the language is the target translation language of the time information. For example: when an application needs to be translated from a Chinese application to an English application, the target translation language of time information is English. Time units contained in the time information may include: one or more of century, year, quarter, month, day, week, hour, quarter, minute, second, etc. The number of bits of data of a time unit refers to the number of bits of data representing the value of a time unit. For example, for the time unit "year", when it is identified by "18", "21", etc., the number of bits of data thereof is 2, while when it is identified by "2018", "2021", etc., the number of bits of data thereof is 4. For another example: for the time unit "month", when it is identified by "1", "5", etc., the number of bits of data thereof is 1, while when it is identified by "01", "05", etc., the number of bits of data thereof is 2.

S13. Determining a display format according to the attribute information.

That is, the display format corresponding to the time information is acquired according to the attribute information of the time information.

It should be noted that, when an application to be translated includes a plurality of time information, since there may be differences between attribute information of individual time information, it is necessary to acquire the display format corresponding to each time information according to attribute information of each time information.

As one optional implementation of the embodiment of the present disclosure, the determining the display format according to the attribute information comprises following steps 1 and 2:

Step 1. Acquiring a format identifier according to the attribute information.

In some embodiment, the implementation of acquiring the format identifier according to the attribute information may include following steps a and b:

Step a: Acquiring a target calculation value based on a preset algorithm to calculate the attribute information.

That is, the attribute information is used as the input of the preset algorithm, and the output of the preset algorithm is acquired as the target calculation value.

Step b. Acquiring the format identifier according to the target calculation value.

It should be noted that, the input and output of the preset algorithm in the embodiment of the present disclosure are in one-to-one correspondence, and a unique input to the preset algorithm can be calculated to acquire a unique output of the preset algorithm, thereby ensuring that different format identifiers can be obtained according to different attribute information.

In some embodiment, the implementation of acquiring the format identifier according to the target calculation value may comprise: directly using the target calculation value as the format identifier.

In some embodiment, the implementation of acquiring the format identifier according to the target calculation value may further comprise: acquiring the format identifier by processing the target calculation value in a preset processing method. Exemplarily, the preset processing method may intercept the numerical value of first n bits of the target calculation value, where n is a positive integer.

Step 2: Determining the display format according to the format identifier and a configuration file.

Wherein, the configuration file includes a correspondence between the format identifier and the display format.

In some embodiment, before above step 2, the method for translating an application in the embodiment of the present disclosure further comprises: generating the configuration file, and pre-configuring the configuration file into the execution body of the method for translating an application provided by the embodiment of the present disclosure. Wherein, the implementation of generating the configuration file may comprise: generating format identifiers corresponding to various time information according to attribute information of various time information, acquiring display formats corresponding to various time information, establishing correspondences between the format identifiers and display formats of various time information, and generating the configuration file.

Exemplarily, the configuration file in the embodiment of the present disclosure may be as shown in Table 1 below:

TABLE 1

| Configuration file | | |
|---|---|---|
| Format identifier | Display format | Example |
| Identifier 1 | MM/DD/YYYY | 08/25/2021 |
| Identifier 2 | YYYY/MM/DD | 2021/08/25 |
| Identifier 3 | MMMM D, YYYY | Aug. 16, 2018 |
| Identifier 4 | MMMM YYYY | August 2018 |
| Identifier 5 | MMMM DD | August 16 |
| Identifier 6 | M/D/YYYY | 9/25/2015 |
| Identifier 7 | HH:mm A | 18:40 AM |
| Identifier 8 | HH:mm:ss A | 18:40:14 AM |
| . | . | . |
| . | . | . |
| . | . | . |

S14. Translating the time information based on the display format.

Exemplarily, on the basis of the configuration file shown in Table 1 above, when the time information is: 2021/09/09, and the format identifier acquired according to the attribute information of the time information is identifier 5, then the display format "MMMM DD" can be acquired according to the identifier 5 and the configuration file as shown in Table 1, and the time information can be translated as: September 09, based on the display format "MMMM DD".

When translating an application, the method for translating an application provided by the embodiment of the present disclosure first detects time information in the application to be translated, and acquires attribute information of the time information, and then determines a display format of the time information according to the attribute information, and translates the time information based on the display format. Since the method for translating an application provided by the embodiments of the present disclosure can acquire display format of time information according to attribute information of the time information in the application to be translated, when translating the time information in the application, the embodiments of the present disclosure can use a specified format to translate the time information in the application to avoid random errors that may be caused by manually determining the display format of the time information, therefore, the embodiments of the present disclosure can solve the issue that display format of time information in a translated application is incorrect.

Figure 2:
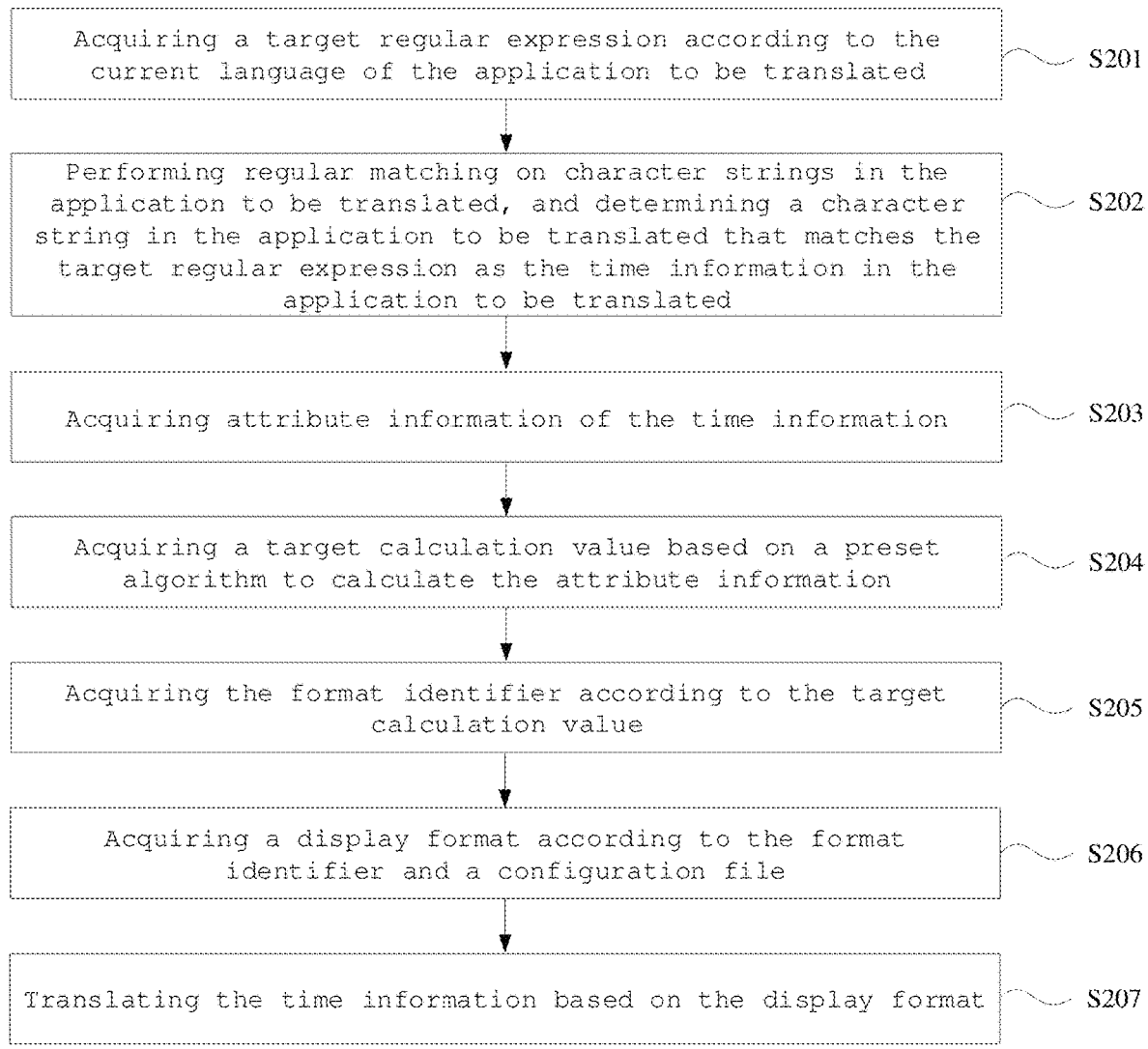
FIG. 2 is one of the flow charts of the steps of a method for translating an application provided by some embodiments of the present disclosure.

As an extension and refinement of the above embodiment, some embodiment of the present disclosure provides another method for translating an application. Referring to FIG. 2, the method for translating an application comprises following steps:

S201. Acquiring a target regular expression according to the current language of the application to be translated.

Specifically, in each language environment, time and date both have specific display rules, so the target regular expression can be generated according to display rules of time and date in the current language.

For example, according to display rules of time information in Chinese, the regular expression for date in Chinese can be: /^[1-9]\d{3}-(0[1-9]11[0-2])-(0[1-9]1[1-2][0-9]13

[0-1])$/; and the regular expression for time can be: /^(20|21|22|23|[0-1]\d):[0-5]\d:[0-5]\d$/; and the regular expression for date+time can be: /^[1-9]\d{3}-(0[1-9]|1[0-2])-(0[1-9]|[1-2][0-9]|3[0-1])\s+(20|21|22|23|[0-1]\d):[0-5]\d:[0-5]\d$/; therefore, when an application to be translated is a Chinese application, the above regular expressions can be determined as target regular expressions.

S202. Performing regular matching on character strings in the application to be translated, and determining a character string in the application to be translated that matches the target regular expression as the time information in the application to be translated.

By performing regular matching on character strings in the application to be translated, and determining a character string in the application to be translated that matches the target regular expression as the time information in the application to be translated, it is possible to detect the time information in the application to be translated quickly, and to avoid misidentification or omission of the time information in the application to be translated.

S203. Acquiring attribute information of the time information.

Wherein, the attribute information includes at least one of target translation languages of the time information, time units contained in the time information, and a number of bits of data of individual time units of the time information.

Specifically, the time information can be identified and analyzed to acquire attribute information of the time information. For example, if the detected time information is "2021/09/09", the three time units "year", "month" and "day" contained in the time information can be acquired, and the number of bits of data of "year" is 4, the number of bits of data of "Month" is 2, and the number of bits of data of "Day" is 2.

S204. Acquiring a target calculation value based on a preset algorithm to calculate the attribute information.

That is, the attribute information is used as the input of the preset algorithm, and the output of the preset algorithm is acquired as the target calculation value.

In some embodiment, the preset algorithm can be a Message-Digest Algorithm (MD5) algorithm.

In some embodiment, the preset algorithm can also be a Hash algorithm.

On the basis of foregoing embodiment, the preset algorithm can also be other algorithms, which are not limited in the embodiments of the present disclosure, as long as a unique target calculation value can be obtained according to unique attribute information.

S205. Acquiring the format identifier according to the target calculation value.

In some embodiments, the target calculation value can be directly used as the format identifier.

In some embodiments, the format identifier can be acquired by processing the target calculation value based on a preset processing method.

S206. Acquiring a display format according to the format identifier and a configuration file.

Wherein, the configuration file includes a correspondence between the format identifier and the display format.

S207. Translating the time information based on the display format.

In some embodiment, translating the time information based on the display format comprises:

setting at least one of the time units contained in the translated time information, the sort order of individual time units of the translated time information, the number of bits of individual time units of the translated time information, and whether individual time units of the translated time information use plural form, based on the display format.

In different language environments, time information needs to contain different time units. Setting time units contained in the translated time information through the display format can avoid the lack of or excess of a certain time unit in the translated time information, thereby ensuring the translated time information correct. For example: When translating the time information "2021 年5月28日星期五 15:00", if the target translation language is English, since display rules for English are in a 12-hour format and need to specify the morning/afternoon, the translated time information can be set to include the time unit "AM/PM" through the display format, which in turn translates the time information to be "Friday, May 28, 2021 3:00 PM".

In different language environments, the sort order of individual time units of the time information is different. Setting the sort order of individual time units of the translated time information through the display format can ensure the translated time information correct. For example: when translating the time information "2021年5月28日", if the target translation language is English, since the expression order of "year, month, day" in English is: month, day, year, the sort order of the time units of the translated time information can be set as month, day, and year through the display format, which in turn translates the time information to be "May 28, 2021".

In different language environments, the definition of whether individual time units of the time information need to use plural form is different. Setting whether to use plural form for individual time units of the translated time information through the display format can ensure the translated time information correct. For example: "in 11 hours" in English to express the next 11 hours is the plural form. In Russian, no matter it is 11, 21, or 101, as long as the last digit is 1, it is regarded as singular. Therefore, in Russian expression, "через 11 ч" in Russian to express the next 11 hours is singular form. There is no distinguish between singular and plural in Japanese, so the Japanese expression for the next 11 hours in Japanese is "11 時間後".

When translating an application, the method for translating an application provided by the embodiments of the present disclosure first detects time information in the application to be translated, acquires attribute information of the time information, and then determines a display format of the time information according to the attribute information, and translates the time information based on the display format. Since the method for translating an application provided by the embodiments of the present disclosure can acquire a display format of time information according to attribute information of the time information in the application to be translated, when translating the time information in the application, the embodiments of the present disclosure can use a specified format to translate the time information in the application to avoid random errors that may be caused by the manually determining the display format of the time information, therefore, the embodiments of the present disclosure can solve the issue that display format of time information in a translated application is incorrect.

Based on the same inventive concept, as an implementation of above method, some embodiment of the present disclosure further provides an apparatus for translating an application. The apparatus embodiment corresponds to foregoing method embodiment, thus for ease of reading, the apparatus embodiment will describe these details in the method embodiments described above one by one, but it should be clear that the apparatus for translating an application in this embodiment can correspondingly implement all of those contents in the foregoing method embodiments.

Figure 3:
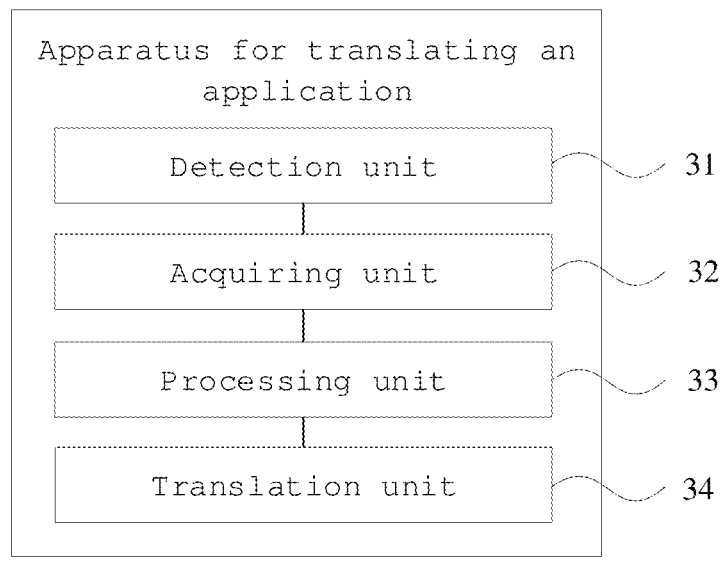
FIG. 3 is a schematic structural diagram of an apparatus for translating an application provided by some embodiments of the present disclosure.

Some embodiment of the present disclosure provides an apparatus for translating an application. FIG. 3 is a schematic structural diagram of the apparatus for translating an application. As shown in FIG. 3, the apparatus for translating an application 300 comprises:

A detection unit 31 for detecting time information in the application to be translated;

A acquiring unit 32 for acquiring attribute information of the time information, the attribute information including at least one of target translation languages of the time information, time units contained in the time information, and a number of bits of the data of individual time units of the time information;

A processing unit 33 for acquiring a display format according to the attribute information;

A translation unit 34 for translating the time information based on the display format.

In some other embodiment, the processing unit 33 is specifically used to acquire a format identifier according to the attribute information; and determine the display format according to the format identifier and a configuration file;

Wherein, the configuration file includes a correspondence between the format identifier and the display format.

In some other embodiment, the processing unit 33 is specifically used to acquire a target calculation value based on a preset algorithm to calculate the attribute information, and acquire the format identifier according to the target calculation value.

In some other embodiment, the preset algorithm is a message digest algorithm MD5 or a hash algorithm.

In some other embodiment, the detection unit 31 is specifically used to perform regular matching on character strings in the application to be translated, and determine a character string in the application to be translated that matches a target regular expression as the time information in the application to be translated.

In some other embodiment, the detection unit 31 is further used to acquire the target regular expression according to the current language of the application to be translated before performing regular matching on character strings in the application to be translated.

In some other embodiment, the translation unit 34 is specifically used to set at least one of the time units contained in the translated time information, the sort order of individual time units of the translated time information, the number of bits of individual time units of the translated time information, and whether individual time units of the translated time information use plural form, based on the display format.

The apparatus for translating an application provided in the embodiment of the present disclosure can implement the method for translating an application provided in the foregoing embodiments, and implementation principles and technical effects thereof are similar, and thus will not be repeated here.

Figure 4:
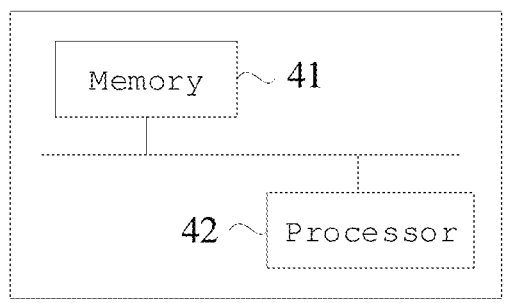
FIG. 4 is a schematic diagram of a hardware structure of an electronic device provided by some embodiments of the present disclosure.

Based on the same inventive concept, some embodiment of the present disclosure also provides an electronic device. FIG. 4 is a schematic structural diagram of an electronic device provided by some embodiment of the present disclosure. As shown in FIG. 4, the electronic device provided by the embodiment comprises: a memory 41 and a processor 42, the memory 41 is used to store a computer program; when invoking and executing the computer program, the processor 42 is used to cause the electronic device to implement the method for translating an application provided by the above embodiments.

Specifically, the memory 41 can be used to store software programs and various data. The memory 41 may mainly include a storage program area and a storage data area, wherein the storage program area may store an operating system, an application required for at least one function (such as a sound playback function, an image playback function, etc.) and the like; the storage data area may store data created according to the use of the mobile phone (such as audio data, phone book, etc.) and the like. Additionally, memory 41 may include a high-speed random access memory, and may also include a non-volatile memory, such as at least one magnetic disk storage device, a flash memory device, or other volatile solid-state storage device.

The processor 42 is the control center of the electronic device, which connects to various parts of the entire electronic device using various interfaces and lines, and performs various functions of the electronic device and processes data by running or executing the software programs and/or modules stored in the memory 41 and calling the data stored in the memory 41, so as to monitor the electronic device as a whole. Processor 42 may include one or more processing units.

In addition, it should be understood that the electronic device provided by the embodiment of the present disclosure may further comprise components such as a radio frequency unit, a network module, an audio output unit, a receiving unit, a sensor, a display unit, a user receiving unit, an interface unit, and a power supply etc. Those skilled in the art can understand that the structure of the electronic device described above does not constitute a limitation on the electronic device, and the electronic device may comprise more or less components, or combine some components, or in different components arrangement. In the embodiments of the present disclosure, the electronic device includes but is not limited to a mobile phone, a tablet, a notebook, a handheld computer, a vehicle-mounted terminal, a wearable device, a pedometer, and the like.

Some embodiment of the present disclosure further provides a non-transitory computer-readable storage medium having a computer program stored thereon, which, when executed by a computing device, causes the computing device to implement the method for translating an application provided in above embodiments.

Some embodiment of the present disclosure also provides a computer program product, which, when runs on a computer, causes the computer to implement the method for translating an application provided by above embodiments.

As will be appreciated by one skilled in the art, embodiments of the present disclosure may be provided as a method, system, or computer program product. Accordingly, the present disclosure may take the form of an entirely hardware embodiment, an entirely software embodiment, or some embodiment combining software and hardware aspects. Furthermore, the present disclosure may take the form of a computer program product embodied on one or more computer-usable storage media having computer-usable program code included therein.

The processor may be a Central Processing Unit (CPU), or may be other general purpose processor, a Digital Signal Processor (DSP), an Application Specific Integrated Circuit (ASIC), an Field-Programmable Gate Array (FPGA) or other programmable logic devices, discrete gate or transistor logic devices, discrete hardware components, etc. A general purpose processor may be a microprocessor or the processor may be any conventional processor, etc.

The memory may include a form of a non-persistent memory, a random access memory (RAM) and/or a non-volatile memory etc. in computer readable media, for example, a read only memory (ROM) or a flash memory (flash RAM). The memory is an example of a non-transitory computer-readable medium.

The computer readable media includes persistent and non-permanent, removable and non-removable storage media. A storage medium can implement information storage by any method or technology, and the information can be computer readable instructions, data structures, modules of programs, or other data. Examples of computer storage media include, but are not limited to, a phase-change memory (PRAM), a static random access memory (SRAM), a dynamic random access memory (DRAM), other type of random access memory (RAM), a read only memory (ROM), a Electrically Erasable Programmable Read Only Memory (EEPROM), a Flash memory or other memory technology, a Compact Disc Read Only Memory (CD-ROM), a Digital Versatile Disc (DVD) or other optical storage, a magnetic tape cartridge, a magnetic disk storage or other magnetic storage devices or any other non-transmission medium that can be used to store information that can be accessed by a computing device. Computer-readable media, as defined herein, excludes transitory computer-readable media, such as modulated data signals and carrier waves.

Finally, it should be noted that above embodiments are only used to illustrate the technical solutions of the present disclosure, but not to limit thereof; although the present disclosure has been described in detail with reference to the foregoing embodiments, those of ordinary skill in the art should understand that: the technical solutions described in the foregoing embodiments can still be modified, or some or all of the technical features thereof can be equivalently replaced; and these modifications or replacements do not make the essence of the corresponding technical solutions deviate from the scope of the technical solutions of the embodiments of the present disclosure.

What is claimed is:

1. A method for translating an application, comprising:
   detecting time information in the application to be translated;
   acquiring attribute information of the time information, the attribute information including target translation languages of the time information, time units contained in the time information, and a number of bits of the data of individual time units of the time information;
   acquiring a target calculation value based on a preset algorithm to calculate the attribute information;
   acquiring a format identifier by intercepting numerical values of first n bits of the target calculation value in a preset processing method, where n is a positive integer;
   determining a display format according to the format identifier and a configuration file, wherein the configuration file including a correspondence between the format identifier and the display format; and
   translating the time information based on the display format, wherein
   in response to the application to be translated including a plurality of pieces of time information, a respective attribute information of each piece of the time information is acquired such that the display format corresponding to each piece of the time information is determined according to attribute information of corresponding time information and each piece of the time information is translated based on corresponding display format.

2. The method according to claim 1, wherein the preset algorithm is a message digest algorithm MD5 or a hash algorithm.

3. The method according to claim 1, wherein the detecting time information in the application to be translated comprises:
   performing regular matching on character strings in the application to be translated, and determining a character string in the application to be translated that matches a target regular expression as the time information in the application to be translated.

4. The method according to claim 3, wherein before performing regular matching on character strings in the application to be translated, the method further comprises:
   acquiring the target regular expression according to the current language of the application to be translated.

5. The method according to claim 1, wherein the translating the time information based on the display format comprises:
   setting at least one of the time units contained in the translated time information, the sort order of individual time units of the translated time information, the number of bits of individual time units of the translated time information, or whether individual time units of the translated time information use plural form, based on the display format.

6. An electronic device, comprising: a memory and a processor, the memory being used to store a computer program; when invoking the computer program, the processor being used to cause the electronic device to implement the method for translating an application according to any one of claims 1 and 2-5.

7. A non-transitory computer-readable storage medium, the non-transitory computer-readable storage medium has computer programs stored thereon, which, when executed by a computing device, causes the computing device to implement the method for translating an application according to any one of claims 1 and 2-5.

* * * * *